United States Patent [19]

Sternberg

[11] Patent Number: 4,665,554
[45] Date of Patent: May 12, 1987

[54] APPARATUS AND METHOD FOR IMPLEMENTING DILATION AND EROSION TRANSFORMATIONS IN DIGITAL IMAGE PROCESSING

[75] Inventor: Stanley R. Sternberg, Ann Arbor, Mich.

[73] Assignee: Machine Vision International Corporation, Ann Arbor, Mich.

[21] Appl. No.: 513,448

[22] Filed: Jul. 13, 1983

[51] Int. Cl.[4] .............................................. G06K 9/00
[52] U.S. Cl. ........................................ 382/27; 382/49
[58] Field of Search ............................ 382/27, 49–50, 382/54; 333/165; 307/606, 607

[56] References Cited

U.S. PATENT DOCUMENTS

| | | | |
|---|---|---|---|
| 3,106,699 | 10/1963 | Kamentsky | 340/172.5 |
| 3,214,574 | 10/1965 | Landsman et al. | 235/92 |
| 3,339,179 | 8/1967 | Shelton, Jr. et al. | 340/146.3 |
| 3,573,789 | 4/1971 | Sharp et al. | 340/324 |
| 3,675,049 | 7/1972 | Haven | 307/606 |
| 3,805,035 | 4/1974 | Serra | 382/49 |
| 3,846,754 | 11/1974 | Oka et al. | 340/146.3 H |
| 3,899,771 | 8/1975 | Saraga et al. | 340/146.3 AE |
| 4,167,728 | 9/1979 | Sternberg | 340/146.3 MA |
| 4,174,514 | 11/1979 | Sternberg | 340/146.3 MA |
| 4,290,049 | 9/1981 | Sternberg et al. | 340/146.3 MA |
| 4,301,443 | 11/1981 | Sternberg et al. | 340/146.3 MA |
| 4,322,716 | 3/1982 | Sternberg | 340/146.3 MA |
| 4,369,430 | 1/1983 | Sternberg | 340/146.3 MA |
| 4,395,697 | 7/1983 | Dargel et al. | 382/41 |
| 4,395,698 | 7/1983 | Sternberg et al. | 382/27 |
| 4,395,699 | 7/1983 | Sternberg | 382/41 |
| 4,395,700 | 7/1983 | McCubbrey et al. | 382/27 |

OTHER PUBLICATIONS

"Industrial Computer Vision by Mathematical Morphology" by Stanley R. Sternberg; Proceedings of the 13th International Symposium on Industrial Robots/-Robots 7, Chicago, Ill., Apr. 18–20, 1983.

"Biomedical Image Processing" by Stanley R. Sternberg; Copyright 1983 IEEE; published Jan. 1983, issue of *Computer*, pp. 22–34.

"Computer Architectures Specialized for Mathematical Morphology" by Stanley R. Sternberg, Dept. of Electrical and Computer Engineering, University of Michigan; Workshop on Algorithmically Specialized Computer Organizations, Purdue Univ., West Lafayette, IN, Sep. 29–Oct. 1, 1982.

"A Comparison of Computer Vision Methodologies" by Stanley R. Sternberg; Dec. 21, 1981, *Cytosystems Corp. Publication*.

"Computer Architectures for Pictorial Information Systems" by Per-Erik Danielsson and Stefano Levialdi; Copyright 1981 IEEE; published in Nov. 1981, issue of *Computer*, pp. 53–67.

Pages 836–840 of IEEE Transactions on Computers, vol. C-29, No. 9, Sep. 1980, "Design of a Massively Parallel Processor" by Kenneth E. Batcher; Copyright 1980 IEEE.

"A Systemically Designed Binary Array Processor" by Anthony P. Reeves, published in the IEEE Transactions on Computers, vol. C-29, No. 4, Apr. 1980, pp. 278–287.

"Design and Use of DIP-1: A Fast, Flexible and Dynamically Microprogrammable Pipelined Image Processor" by F. A. Gerritsen and L. G. Aardema, Delft University of Technology, Delft, The Netherlands, Jan. 1980, Revised May 1980.

"Parallel Architectures for Image Processing" by Stanley R. Sternberg; Copyright 1979 IEEE Compsac.

"Basics of Cellular Logic with Some Applications in Medical Image Processing" by Kendall Preston, Jr., Michael J. B. Duff, Stephano Levialdi, Philip E. Norgren, and Jun-Ichiro Toriwaki; published in May 1979 Proceedings of the IEEE, vol. 67, No. 5, pp. 826–859.

(List continued on next page.)

Primary Examiner—Leo H. Boudreau
Attorney, Agent, or Firm—Price, Heneveld, Cooper, DeWitt & Litton

[57] ABSTRACT

The specification discloses a system and a method for processing digital representations of images to produce dilations and erosions at unparalleled speeds and efficiencies. The system includes digital circuitry for effecting a dilation by repetitively delaying the serialized digital image and ORing the delayed digital image back into the serial signal stream.

31 Claims, 34 Drawing Figures

OTHER PUBLICATIONS

"Cytocomputer Real-Time Pattern Recognition" by Stanley R. Sternberg; based on presentation to the Eighth Annual Automatic Imagery Pattern Recognition Symposium, National Bureau of Standards, Gaithersburg, Maryland, Apr. 3-4, 1978.

"Advanced Analysis of SLR Changes" Westinghouse Electric Corporation; Final Technical Report, Nov. 1974, Report sent to Rome Air Development Center, Air Force Systems Command, Griffiss Air Force Base, New York 13441.

"A Parallel Picture Processing Machine" by Bjorn Kruse, Published in Dec. 1973, issue of IEEE Transactions on Computers, vol. C-22, No. 12, pp. 1075-1086.

"Interactive Image Processor Speeds Pattern Recognition by Computer" by Kendall Preston, Jr. and Philip E. Norgren, Published in Oct. 23, 1972, issue of *Electronics*, pp. 89-98.

"The Texture Analyser" by J. C. Klein and J. Serra, Published in the Apr. 1972 Journal of Microscopy, vol. 95, Pt 2, pp. 349-356.

"Feature Extraction by Golay Hexagonal Pattern Transforms" by Kendall Preston, Jr., Published in the Sep. 1971 issue of IEEE Transactions on Computers, pp. 1007-1014, vol. C-20, No. 9.

"Local Properties of Binary Images in Two Dimensions" by Stephen B. Gray, Published in the May 1971 issue of IEEE Transactions on Computers, vol. C-20, No. 5, pp. 551-561.

"Hexagonal Parallel Pattern Transformations" by Marcel J. E. Golay, Published in the Aug. 1969 issue of IEEE Transactions on Computers, vol. C-18, No. 8, pp. 733-739.

"The Illinois Pattern Recognition Computer-ILLIAC III" by Bruce H. McCormick, Published in the 1963 issue of IEEE Transactions on Electronic Computers, pp. 791-813.

"Blood-Cell Scanner Identifies Rare Cells" by Nicholas F. Izzo and William Coles, Published in the Apr. 27, 1962 issue of *Electronics*, pp. 52-57.

"Pattern Detection and Recognition" by S. H. Unger, Published in the Oct. 1959 issue of the Proceedings of the IRE, pp. 1737-1752.

"A Computer Oriented Toward Spatial Problems" by S. H. Unger, Published in the Oct. 1958 issue of the Proceedings of the IRE, pp. 1744-1750.

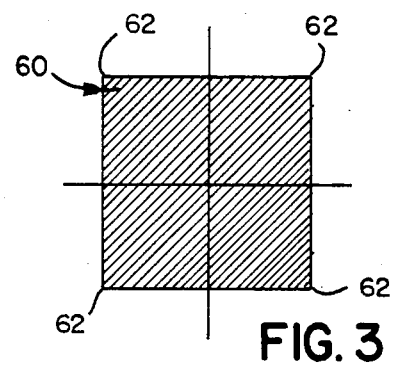
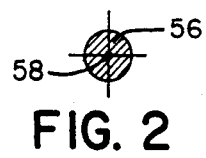
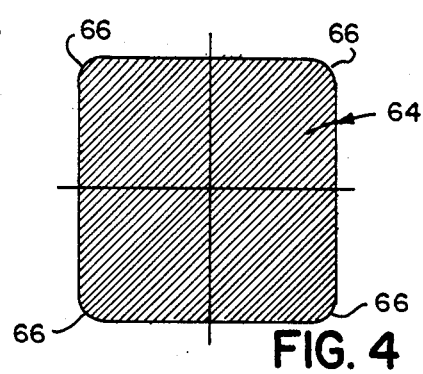
FIG. 3   FIG. 2   FIG. 4
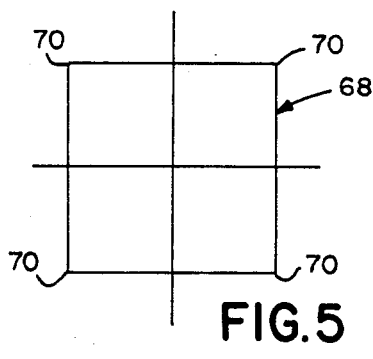
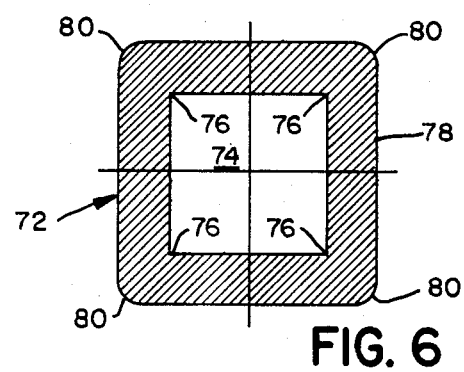
FIG. 5   FIG. 6
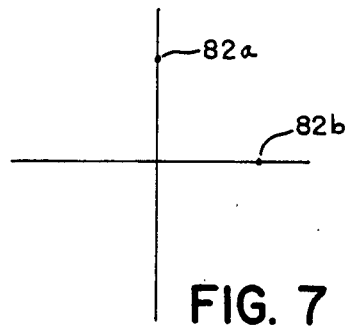
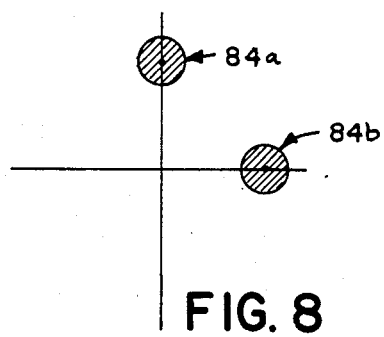
FIG. 7   FIG. 8
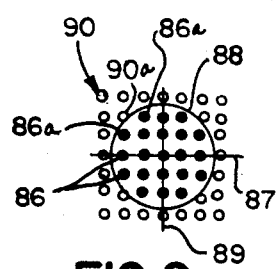 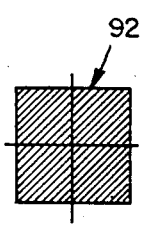 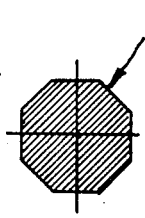 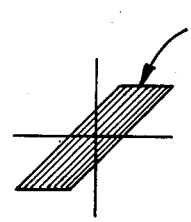
FIG. 9   FIG. 10   FIG. 11   FIG. 12

APPARATUS AND METHOD FOR IMPLEMENTING DILATION AND EROSION TRANSFORMATIONS IN DIGITAL IMAGE PROCESSING

BACKGROUND OF THE INVENTION

The present invention relates to image processing systems and methods, and more particularly to digital systems and methods.

A wide variety of image processing systems have been developed enabling digital computers to "see" or "read" an image. Typically, these image processors include a video camera, an analog-to-digital converter for digitizing the video signal produced by the camera, and a digital device for processing the digitized information. Typically, the image is digitized into a matrix or lattice of pixels with 512 pixels for each video scan line. These image processors using a camera as an "eye", an analog-to-digital converter as an "optic nerve", and a digital computing device as a "brain" are capable of scanning digital images and processing the digital information to interpret the image.

One relatively efficient image processor, known as a cytocomputer and developed by the Environmental Research Institute of Michigan (ERIM) located in Ann Arbor, Mich., utilizes "neighborhood theory" and "mathematical morphology" to manipulate a digital image. Disclosures of this system are provided in U.S. Pat. No. 4,369,430, entitled IMAGE ANALYZER WITH CYCLICAL NEIGHBORHOOD PROCESSING PIPELINE, issued Jan. 18, 1983, To Sternberg; U.S. Pat. No. 4,322,716, entitled METHOD AND APPARATUS FOR PATTERN RECOGNITION AND DETECTION, issued Mar. 30, 1982, to Sternberg; U.S. Pat. No. 4,301,443, entitled BIT ENABLE CIRCUITRY FOR AN IMAGE ANALYZER SYSTEM, issued Nov. 17, 1981, to Sternberg et al; U.S. Pat. No. 4,290,049, entitled DYNAMIC DATA CORRECTION GENERATOR FOR AN IMAGE ANALYZER SYSTEM, issued Sept. 15, 1981, To sternberg et al; U.S. Pat. No. 4,174,514, entitled PARALLEL PARTITIONED SERIAL NEIGHBORHOOD PROCESSORS, issued Nov. 13, 1979, to Sternberg; and U.S. Pat. No. 4,167,728, entitled AUTOMATIC IMAGE PROCESSOR, issued Sept. 11, 1979, to Sternberg; and in an article entitled "Biomedical Image Processing" by Sternberg, published in the January 1983 issue of *Computer* at pages 22-34. By routing the image sequentially through several neighborhood transformations, the computer is able to detect image features which are necessary to control a process, such as manufacturing or material handling. At each transformation stage, the "neighborhood" of pixels surrounding a given pixel in one image are examined and the corresponding pixel in the new image is given a digital value which is a function of the neighborhood pixels in the old image. In a cytocomputer, all neighborhood pixels in an image are made available for processing by serially routing the digital image through one or more shift registers. As the image is shifted through the registers, the appropriate register locations are accessed to process a particular neighborhood.

Although differing from previous image processors, a cytocomputer relying on the neighborhood theory is not without its drawbacks. First, the entire neighborhood of a pixel must be made available and examined before the corresponding pixel in the new image can be given a value. This requires delay and excessively complicated circuitry to make the neighborhood pixels simultaneously available and to drive the function generator utilizing the appropriate neighborhood information. Second, the neighborhood processing theory provides an inefficient and cumbersome method of effecting image erosions and image dilations, the principal operations of the mathematical morphology.

Other image processing systems and methods are known and disclosed in the Disclosure Statement filed with this application. These systems and methods all share the primary disadvantages of the cytocomputer because their processing is restricted to transformations on neighborhoods.

SUMMARY OF THE INVENTION

The aforementioned problems are solved by the present invention. Essentially, an image processor and method is provided for effecting dilations and erosions of an image made up of a matrix of points or pixels at improved speeds, accuracies, and efficiencies using simplified circuitry. More particularly, the image processor includes a digital device for performing a dilation on a digital image through a series of stages, each including a signal delay service and a signal recombination device. More particularly, the digital device comprises a geometric logic unit (GLU) in which the stages are serially coupled such that the output line of one stage is coupled to the input line of the subsequent stage. Each processing stage includes a delay device for delaying the serial signal inputted thereto and a device for combining the inputted signal and the delayed signal to produce an output signal for the next stage. By appropriately selecting the number of processing stages and the length of the delay at each stage, the geometric logic unit efficiently performs an image dilation on a serial digital input stream enabling the entire digital image of approximately 250,000 pixels to be processed during one frame time, i.e., 1/30 of a second. Accordingly, the geometric logic unit efficiently and rapidly performs an image dilation using circuitry quite simplified over that known in the art.

Mathematical morphology is the science of processing and analyzing digital images through image transformations. The dilation operation propogates pixel states throughout some region of an image. The dual operation, erosion, contracts regions of an image in a given state. The transformations of mathematical morphology have hereto only been implemented as neighborhood transformations in computer vision systems. The present invention eliminates the need for neighborhood transformations as a source of dilation and erosion transformations. Thus, the present invention is both a simplification and an extension of the current methodology.

The present image processor eliminates the need for circuitry required to make a neighborhood of pixels accessible. Consequently, the processor is capable of dilating and eroding an image at relatively rapid speeds using comparatively simple circuitry as compared with known processors in the art.

These and other objects, advantages, and features of the invention will be more readily understood and appreciated by reference to the drawings and detailed description of the preferred embodiment.

BRIEF DESCRIPTION OF THE DRAWINGS

FIG. 3 is a diagram of an image to be dilated;

FIG. 4 is a diagram of the dilation of the FIG. 3 image by the FIG. 2 structuring element;

FIG. 5 is a diagram of another image to be dilated;

FIG. 6 is a diagram of the dilation of the FIG. 5 image by the FIG. 2 structuring element;

FIG. 7 is a diagram of yet another image to be dilated;

FIG. 8 is a diagram of the dilation of the FIG. 7 image by the FIG. 2 structuring element;

FIG. 9 is a diagram of a digital disk utilized as a structuring element in the present application;

FIGS. 10-12 are illustrations of polar symmetric structuring elements;

FIG. 21 is a detailed schematic view of the geometric logic unit;

DETAILED DESCRIPTION OF THE PREFERRED EMBODIMENT

Figure 1:
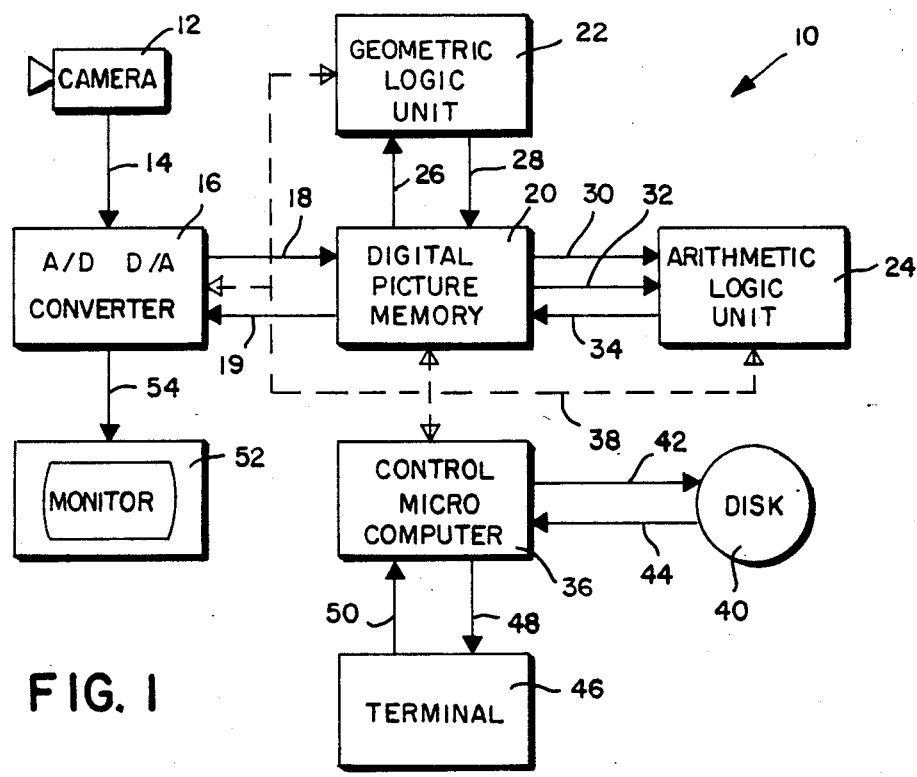
FIG. 1 is a schematic diagram showing the digital image processor of the present invention.

A digital image processor 10 constructed in accordance with a preferred embodiment of the invention is illustrated in FIG. 1. In FIG. 1, data lines are illustrated as solid lines, while control lines are indicated as broken lines. System 10 includes a camera 12 providing a standard TV signal on output line 14. The analog composite video signal is transmitted over line 14 at a rate of 30 frames per second with 480 horizontal scan lines per frame. Analog-to-digital (A/D) and digital-to-analog (D/A) converter 16 converts the analog serial signal received on line 14 to a serial digital signal outputted on line 18 to digital picture memory 20. Similarly, converter 16 can convert a digital signal received on line 19 from memory 20 to an analog signal on line 54 to monitor 52. Alternatively, the analog signal on line 14 can be passed directly to monitor 52 via line 54. The digital signal on line 18 includes one bit for each pixel in the video image. That is to say that the analog signal is digitized into 512 pixels per line on each of the 480 lines. Therefore, the processed image is made up of a matrix of lattice points of pixels. The bit corresponding to a pixel is set to one if the analog pixel signal exceeds a predetermined inftensity and is set to zero if the analog pixel signal does not. The digital picture memory is three 512 by 512 by 1 bit storage devices such that three separate digital images can be stored therein simultaneously. In the preferred embodiment, converter 16 is a Model AD512 converter, and memory 20 is three FB512 storage devices, all manufactured by Imaging Technologies of Wolburn, Mass. In actuality, each of the FB512 storage devices is a 512 by 512 by 8 bit storage device, and only one 512 by 512 bit plane is utilized. Alternatively, one such storage device could be utilized to store 8 separate bit plane images.

Geometric logic unit 22 and arithmetic logic unit 24 are both coupled to digital picture memory 20. Geometric logic unit 22 is modre clearly illustrated in FIG. 21 to be discussed below. Suffice it to say at this point that input data line 26 serially applies a digital bit plane image from frame buffer 20 to geometric logic unit 22 for processing. A digital bit plane image is a single bit binary image. An output serial digital bit plane image is conveyed on line 28 from GLU 22 to digital picture memory 20 for storage in the memory. Arithmetic logic unit 24 is a point processor, meaning that operations are carried out on the input image or images on a pixel-by-pixel basis to create an output image. Data input lines 30 and 32 are utilized to convey one or two digital images from memory 20 to ALU 24 for processing. The digital image created in ALU 24 is outputted on line 34 for storage in memory 20. ALU 24 is capable, for example, of adding two digital images, subtracting two images, multiplying two images, ANDing two images, ORing two images, or complementing an image. ALU 24 is generally well known to those having ordinalry skill in the art and in the preferred embodiment is a Model ALU 512 manufactured by Imaging Technologies of Wolburn, Mass.

Overall system control is provided to system 10 by control microcomputer 36 which is coupled to converter 16, digital memory 20, GLU 22, and ALU 24 through multibus control line 38. Control signals are issued by computer 36 over multibus 38 during each vertical retrace of camera 12 to condition the system 10 for a possible imaging operation during the next frame period of the camera. Specifically, GLU 22 or ALU 24 may be entered and actuated once and only once during each frame period to produce one entire digital bit plane image to be storedd in memory 20. Each frame contains approximately one-quarter million (250,000) pixels, so that in the preferred embodiment GLU 22 and ALU 24 operate at a speed of approximately 10 megahertz to process one entire digital image during approximately one frame cycle and leave sufficient time for control computer 36 to reprogram the units for operation during the next frame cycle. Disk 40 is conventionally coupled through lines 42 and 44 to computer 36 to provide the requisite storage for the computer. Terminal 46·including a keyboard is conventionally coupled through lines 48 and 50 to computer 36 to provide a means of communicating command signals to the computer. In the preferred embodiment, computer 36 comprises a MOTOROLA 68000 microcomputer having 512 K of memory, and disk 40 is manufactured by Control Data. Video monitor 52 is coupled to converter 16 through analog line 54 to output either the image on line 14 or any one of the three images in memory 20.

Figure 2I:
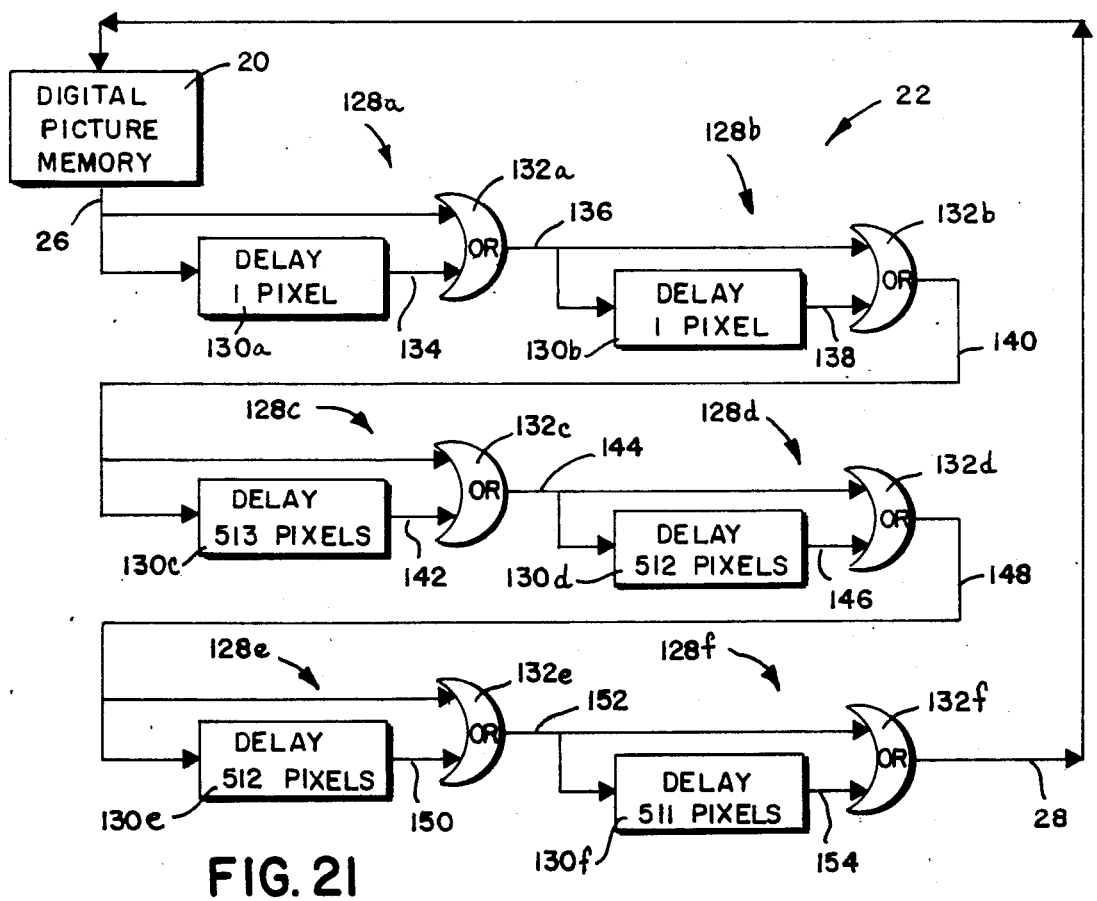
FIG. 2 is a diagram of a disk structuring element.

FIGS. 2-8 illustrate the concept of image dilation, which is one of the fundamental concepts of mathematical morphology. FIG. 2 illustrates a disk structuring element 56 having as its origin 58 the center of the circle. The dilation of an image is the union of translations of the structuring element to all (black) points of the image. Specific examples will now be discussed. A first image 60 (FIG. 3) is a filled square having four sharp corners 62. The dilation of image 60 by structuring element 56 is illustrated in FIG. 4 as image 64. The dilation is obtained by translating origin 58 of structuring element 56 to all points on image 60 and taking the union of all such translations of the structuring element. Image 64 is also generally square having a width which is the width of image 60 plus twice the radius of circular structuring element 56. Additionally, image 64 has four rounded corners 66, each having a radius equal to the radius of the structuring element.

A second image 68 is illustrated in FIG. 5 and is a square outline having four sharp corners 70. When image 68 is dilated by structuring element 56, dilation 72 illustrated in FIG. 6 is formed. The width of each side of image 72 is equal to the diameter of circular structuring element 56. Image 72 defines an internal square 74 having four sharp corners 76 and an outer square 78 having four rounded corners 80. The width of internal square 74 is the width of square 68 minus twice the radius of element 56. The width of square 78 is the width of square 68 plus twice the radius of element 56. The radius on each of rounded corners 80 is identical to the radius of element 56.

One final dilation example using element 56 is offered and illustrated in FIGS. 7 and 8. The image in FIG. 7 consists of two points 82a and 82b. When the image of FIG. 7 is dilated by structuring element 56, the dilation is the FIG. 8 image consisting of two circles 84a and 84b, each having their origin at points 82a and 82b, respectively.

Erosion in mathematical morphology is the dual of dilation and is thoroughly discussed in several of the references disclosed in the Disclosure Statement and particularly in the articles "Basics of Cellular Logic with Some Applications in Medical Image Processing" by Kendall Preston, Jr., Michael J. B. Duff, Stephano Levialdi, Philip E. Norgren, and Jun-Ichiro Toriwaki, published in the May 1979 issue of *Proceedings of the IEEE*, Vol. 67, No. 5, pp 826-859; and "Biomedical Image Processing" by Sternberg, published in the January 1983 issue of *Computer*. As discussed in these articles, through the proper sequence of dilations and erosions, an image can be manipulated or processed to provide visual capabilities to the image processor.

Various structuring elements are illustrated in FIGS. 9-12. FIG. 9 illustrates the concept of a digital disk which comprises all lattice points 86 falling within a circle 88 drawn on a lattice of points 90. The radius of circle 88 is less than $2\sqrt{2}$ because point 90a is not included but greater than $\sqrt{5}$ because points 86a are included. A disk structuring element having its origin at the center of the circle, ssuch as digital disk 86, is polar symmetric, meaning that when the image is reflected about both of the axes 87 and 89, the rotated image is identical to the starting image. The concept of polar symmetry can be extended to any dimension by reflecting the structuring about each of the applicable axes. Other two-dimensional polar symmetric structuring elements are illustrated as the square 92 of FIG. 10, the octagon 94 of FIG. 11, and the parallelogram 96 of FIG. 12. The importance of the polar symmetry of the structuring element will be appreciated in the subsequent discussion of image dilation and erosion.

FIGS. 13-20 illustrates the operation of GLU 22 on a single point 98 of an image input to the GLU from memory 20 on line 26. After the operation of FIGS. 13-20 has been described, the structure of GLU 22 is depicted in FIG. 21 will be described and related to the operation described in FIGS. 13-20. In this example, GLU 22 is operated under the control of computer 36 to dilate a digital image input to the unit on line 26 by the digital structuring element illustrated in FIG. 9. Although the digital image input to GLU 22 will comprise approximately one-quarter million pixels, only the dilation of pixel 98 (FIG. 13) will be described, with the dilation of the remaining pixels being the logical equivalent thereof. If pixel 98 had the binary value "0" (not as illustrated) no dilation of that pixel would occur. If pixel 98 has a binary value of "1", then the pixel is dilated through the series of steps illustrated in FIGS. 14-20 to produce the dilated image of FIG. 20. In FIGS. 13-20, a circle—either open or closed—indicates that the digital signal corresponding to that pixel has a binary value "1", while no circle at a particular pixel location indicates that the pixel has a binary vaalue "0". An open circle at a pixel indicates that the pixel is the result of a shifting operation, while a closed circle at a pixel indicates that that pixel was a "1" in the unshifted digital image but a "0" in the shifted image.

Figure 13:
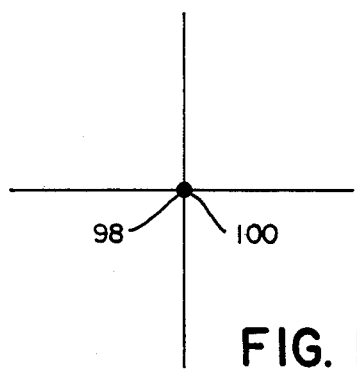
FIG. 13 is a diagram of a single pixel to be dilated by the FIG. 9 structuring element.
Figure 14:
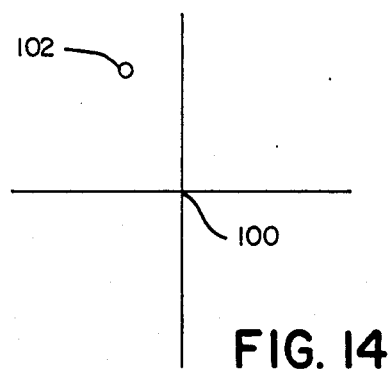
FIGS. 14-20 illustrate virtual images corresponding to the FIG. 13 image at the various stages in the geometric logic unit.
Figure 15:
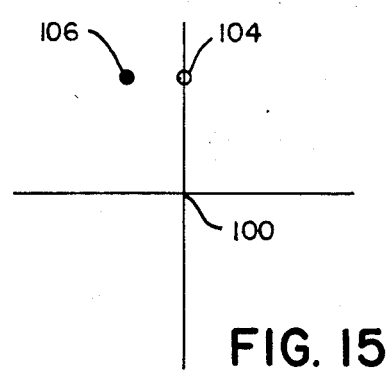
Figure 16:
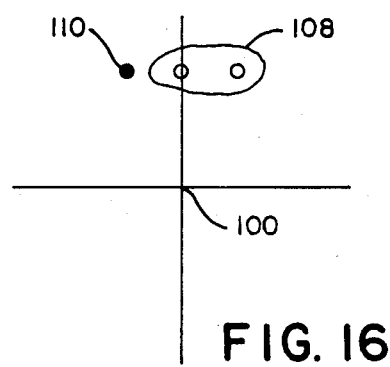

FIG. 13 represents pixel 98 as it resides in digital picture memory 20 at origin pixel location 100. As the first step in dilating pixel 98, the pixel is shifted two pixels upwardly and one pixel to the left to produce pixel 102 (FIG. 14). As the second step in dilating pixel 98, pixel 102 is shifted one position to the right to pixel 104 (FIG. 15) located two positions directly above origin 100. The image in FIG. 15 is then completed by ORing pixel 102 (FIG. 14) with new pixel 104 (FIG. 15) so that pixel 106 is retained in the image illustrated in FIG. 15. In moving from FIG. 15 to FIG. 16, pixels 104 and 106 are shifted right one position to create new pixels 108. The image in FIG. 16 is then completed by ORing pixels 104 and 106 from the image in FIG. 15 with new pixels 108 to retain pixel 110 in the digital image of FIG. 16. Again, moving from FIG. 16 to FIG. 17, pixels 108 and 110 are shifted downwardly one position and right one position to create new pixels 112. The image of FIG. 16 is then ORed with new pixels 112 to retain pixels 114, completing the image of FIG. 17.

Figure 17:
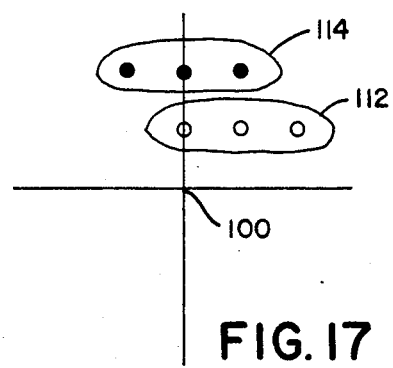
Figure 18:
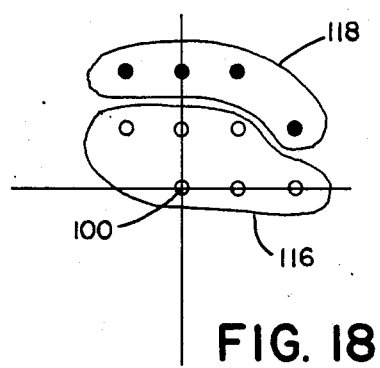
Figure 19:
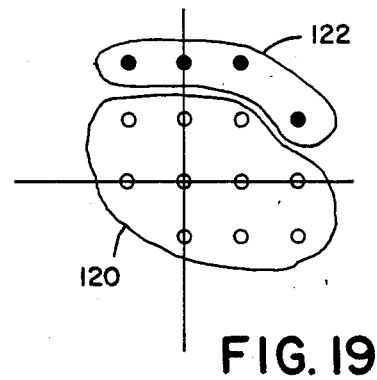
Figure 20:
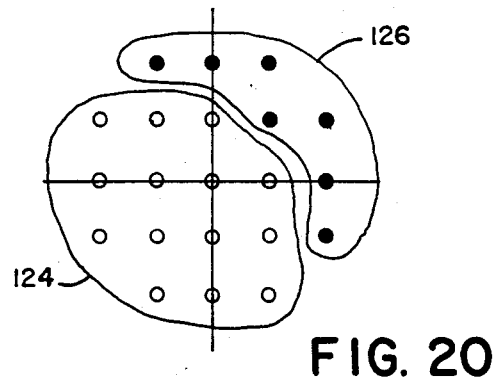

The manipulation of the image through FIGS. 18, 19, and 20 is similar to that previously described. Specifically, in moving from FIG. 17 to 18, pixels 112 and 114 are shifted downwardly one position to create pixels 116. Then, the image of FIG. 17 is ORed with pixels to retain pixels 118 in the image of FIG. 18. In moving from FIG. 18 to FIG. 19, the image of FIG. 18 is shifted downwardly one positiion to create pixels 120. The image at FIG. 18 is then ORed with pixels 120 so that pixels 122 are retained in the image illustrated in FIG. 19. Finally, the digital structuring element is completed in moving from FIG. 19 to FIG. 20, wherein the image of FIG. 19 is shifted to the left one position and downwardly one position to create pixels 124 and ORed with the image of FIG. 19 to retain pixels 126. Therefore, when pixel 98 has a digital value "1", the pixel is dilated by the series of steps illustrated in FIGS. 13-20 such that a digital disk is created about pixel 98 to form the dilation illustrated in FIG. 20.

The structure for implementing the steps of FIGS. 13-20 is illustrated in FIG. 21 which schematically details GLU 22, which comprises a plurality of processing stages 128, each including delay 130 and OR gate 132. Each of delays 130 may be either a fixed-length shift register or a programmable-length shift register, both of which are well known to those having ordinary skill in the art. In the preferred embodiment, delays 130 comprise programmable-length shift registers such that the operation of GLU 22 can be changed from frame period to frame periosd under the control of microcomputer 36 to effect dilation by differing structuring elements. Each of OR gates 132 is also generally well known to those having ordinary skill in the art and include two single-line inputs and a single-line output. Also as is well known, an ORing in the binary case is the specific implementation of a selection of a maximum value. Clocking signals are conventionally provided to delays 130 and OR gates 132 to operate GLU 22.

The number of stages 128 and the length of delays 130 are selected to effect the dilation illustrated in FIGS. 13-20 or of any other desired dilation. The first step of the image dilation, namely in moving from FIG. 13 to FIG. 14, is implemented outside of the GLU 22 by readding pixel 98 (FIG. 13) out of memory 20 shifted by 1025 pixels (512 for each of the two lines shifted upwardly plus 1 for the shift to the left) to shift pixel 98 (FIG. 13) to position 102 (FIG. 14). Therefore, pixel 98 (FIG. 13) resides in memory 20, while the image illustrated in FIG. 14 travels over line 26. Stage 128a implements the processing required to alter the image illustrated in FIG. 14 to the image illustrated in FIG. 15. Specifically, the serial data stream on line 26 is fed both to OR gate 132a and to the 1-pixel delay 130a. The delay of one pixel causes the image to be shifted one position to the right such that pixel 104 exits delay 130a on line 134 while pixel 102 enters the OR gate 132a on line 26. The serial stream exiting OR gate 132a on line 136 is representative of the image illustrated in FIG. 15, which is then routed into stage 128b on line 136. Delay 130b of one pixel effects a shift of the FIG. 15 image one position to the right so that pixels 108 (FIG. 16) exit the delay on line 138 and are ORed with pixels 104 and 106 at gate 132b such that the image illustrated in FIG. 16 is outputted on line 140.

The FIG. 16 image is then inputted to stage 128c which includes delay 130c of 513 pixels which shifts the image one line downwardly and one pixel right. Pixels 112 (FIG. 17) are thus outputted on line 142 and ORed with pixels 108 and 110 (FIG. 16) so that the image illustrated in FIG. 17 is serially outputted on line 144. The processing in moving from FIG. 17 to FIG. 18 is implemented in stage 128d which includes a delay 130d of 512 pixels such that pixels 116 exit the delay on line 146 and are ORed at gate 132d with pixels 112 and 114 (FIG. 17) such that the image illustrated in FIG. 18 exits the OR gate on line 148.

Similarly, the transitions from FIG. 18 to FIG. 19 and from FIG. 19 to FIG. 20 are implemented in stages 128e and 128f, respectively. The serial signal on line 148 is routed to stage 128e and more particularly to OR gate 132e and delay 130e of 512 pixels. Delay 130e shifts the FIG. 18 image downwardly but one line to create pixels 120 (FIG. 19) which exit the delay on line 150. The FIG. 18 image is then ORed with pixels 120 at gate 132e such that the FIG. 19 image is serially outputted on line 152. Finally, the FIG. 19 image is inputted to stage 128f and more particularly to OR gate 132f and delay 130f of 511 pixels. This delay effects a shift downwardly one line and a shift to the left of one pixel such that pixels 124 exit delay on line 154. The inputted and delayed signals are then ORed at gate 132f such thaft the fully dilated image of FIG. 20 exits GLU 22 on line 28 to be stored in digital picture memory 20.

Figure 28:
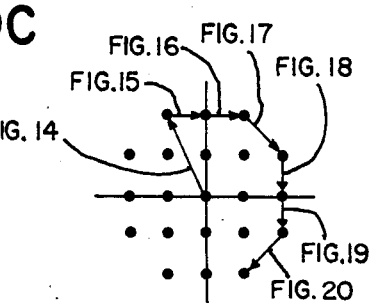
FIG. 28 is a schematic representation of the programming of the geometric logic unit for the digital disk of FIG. 9.

The processing sequence just discussed for performing a dilation by the small digital disk of FIG. 9 employs only the operations of shifting or ORing. The direction and distance of each shift in the preferred embodiment is illustrated in FIG. 28, wherein the arrows indicate the direction and distance of each shift in moving to each FIG. 14-20 just described. It is seen that except for the first shift, the shifts are taken between extreme points on the edge of the structuring element and extend halfway around the periphery of the structuring element. The shifts shown in FIG. 28 and the operations depicted in FIGS. 13-20 have a one-to-one correspondence.

Figure 29A:
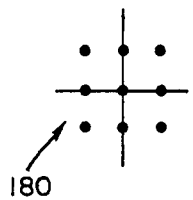
FIGS. 29A, 29B, and 29C illustrate the construction of the digital disk of FIG. 9 using neighborhood elements.
Figure 29B:
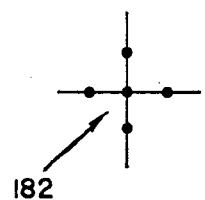
Figure 29C:
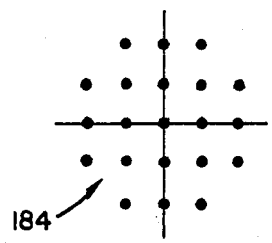

This described dilation example could have equally been accomplished by previously known neighborhood transformations. For example, the neighborhood structuring elements 180 (FIG. 29A) and 182 (FIG. 29B) mutually dilated produce the digital disk 184 of FIG. 29C—identical to the disk of FIG. 9. Neighborhood dilation 184 is obtained as the union of translations of neightborhood element 180 by the points of neightborhood element 182. However, neighborhood operations required to produce large-diameter digital disks are cumbersome and must utilize large neighborhoods (i.e., larger than 3 by 3) which require excessive processing hardware.

Figure 30:
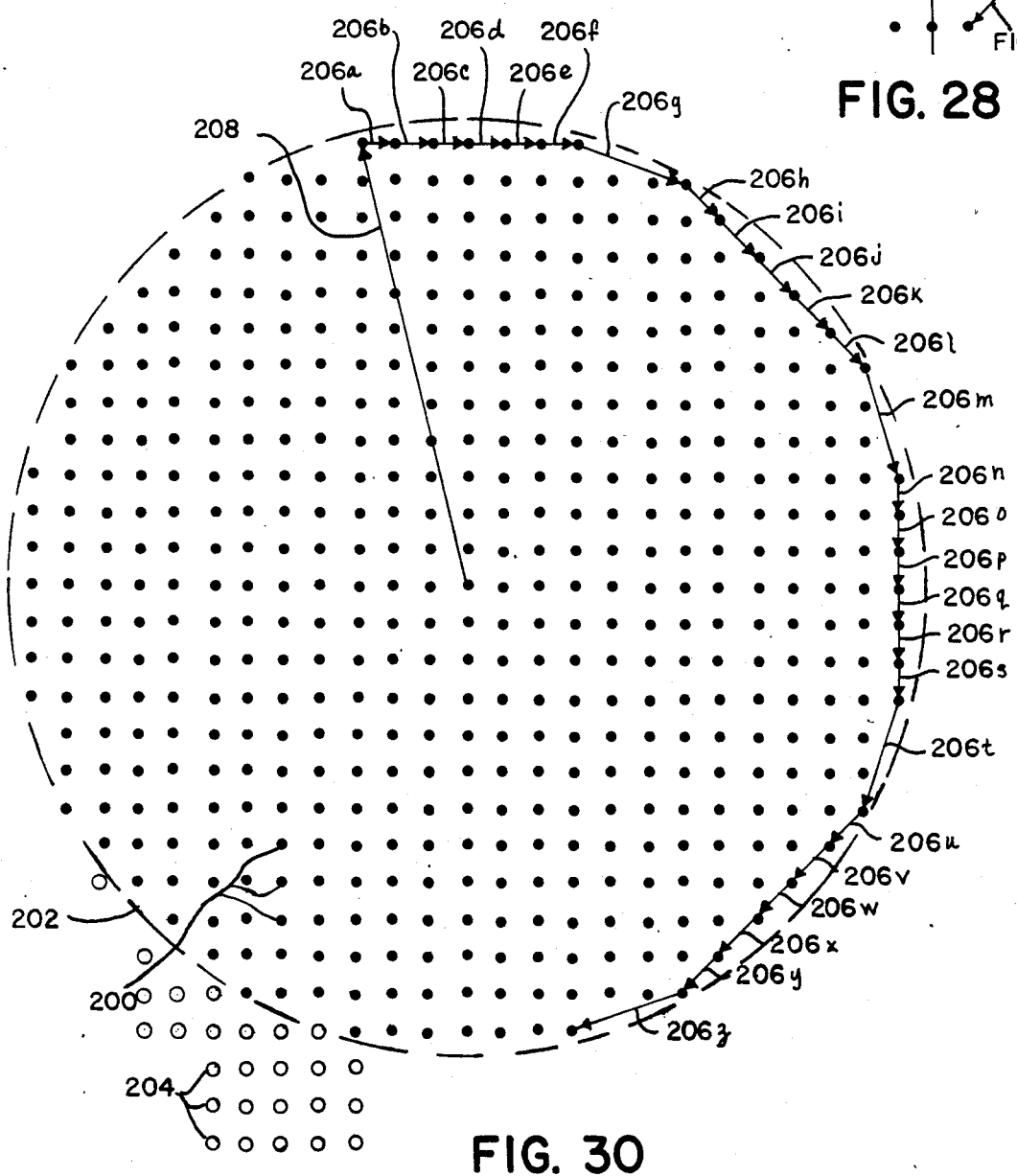
FIG. 30 is a schematic representation of the programming of the geometric logic unit for a relatively large diameter digital disk.

The decomposition of disk 184 into neighborhood elements 180 and 182 is relatively simple; however, in general neighborhood decompositions are extremely difficult and cumbersome. For example, digital disk 200 (FIG. 30) is the intersection of solid Euclidean disk 202 with the set of grid points of digital lattice 204. Decomposition of disk 200 into neighborhood elements requires the use of relatively large (i.e., at least 5 by 5) neighborhood elements (i.e., 25pixels as opposed to 9 pixels for the 3 to 3) to create the many angles involved at the disk perimeter. For example, the edge of digital disk 200 denoted shift 206g cannot be obtained using 3 by 3 neighborhood operations. Dilation by disk 200 is, however, computed relatively easily by the apparatus and method of the present invention, i.e. as a series of shifts and ORs. The required shifts in the GLU are simply the vector translations 206 which are followed in traversing the extreme points halfway around digital disk 200. The initial shift 208 is obtained by shifting the image out of memory 20 by, in this case, 3 pixels to the left and 12 pixels upwardly. Thereafter, the shifts are obtained in accordance with the translations between extreme points of disk 200, which are shown in FIG. 30 as vectors 206a through 206z. In this manner, any convex, polar symmetrical structuring element may be decomposed into shifts and ORs such that dilation may be implemented directly without recourse to neighborhood operations.

By taking advantage of the one of the long-known theorems of mathematical morphology, the present system 10 does not require separate specialized circuitry for eroding an image. The theorem utilized is that the erosion of an image by a structuring element is the dilation of the background of the image by the structuring element reflected about the origin. Stated another way, the dilation of the background of an image is equivalent to the erosion of an image when the structuring element is symmetric about the origin (polar symmetric). When polar symmetric structuring elements (such as digital disk) are used, the theorem may be stated as the erosion of the image is the dilation of the background of the image. Realizing the benefits to be realized by implementing this theorem, I conceived that a digital image can be eroded by complementing the image, dilating the complemented image, and then complementing the dilated image to produce an erosion of the original image.

Therefore, system 10 does not utilize the neighborhood theory in implementing mathematical morphology. Specifically, the rather complex and slow circuitry of known systems required to effect neighborhood transforms on serial digital data are eliminated from the present system. The operation of such a system where erosion is effected by complementing and dilating images is illustrated in FIGS. 22-27, 26A, and 27A.

Figure 22:
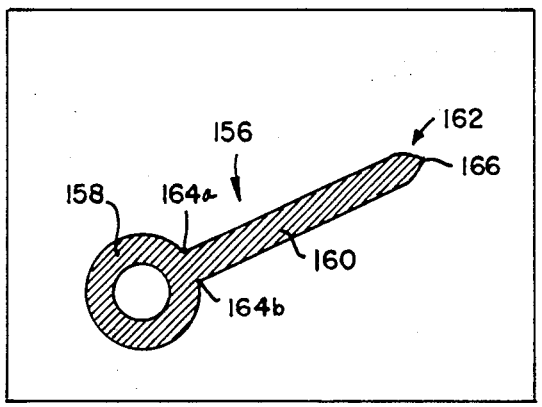
FIG. 22 is a diagram of a real image to be processed by the image processor.
Figure 25:
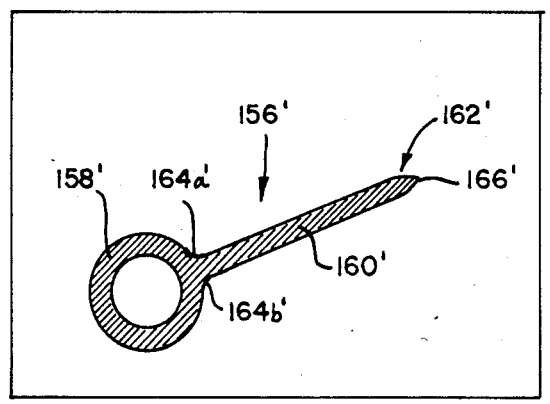
Figure 26:
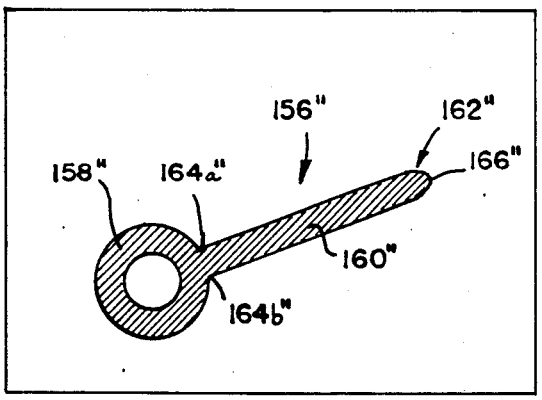
Figure 27:
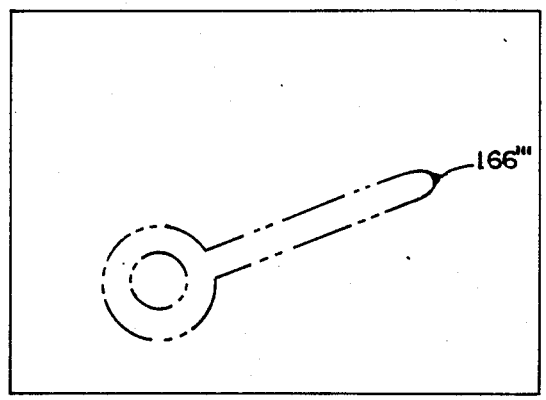
Figure 26A:
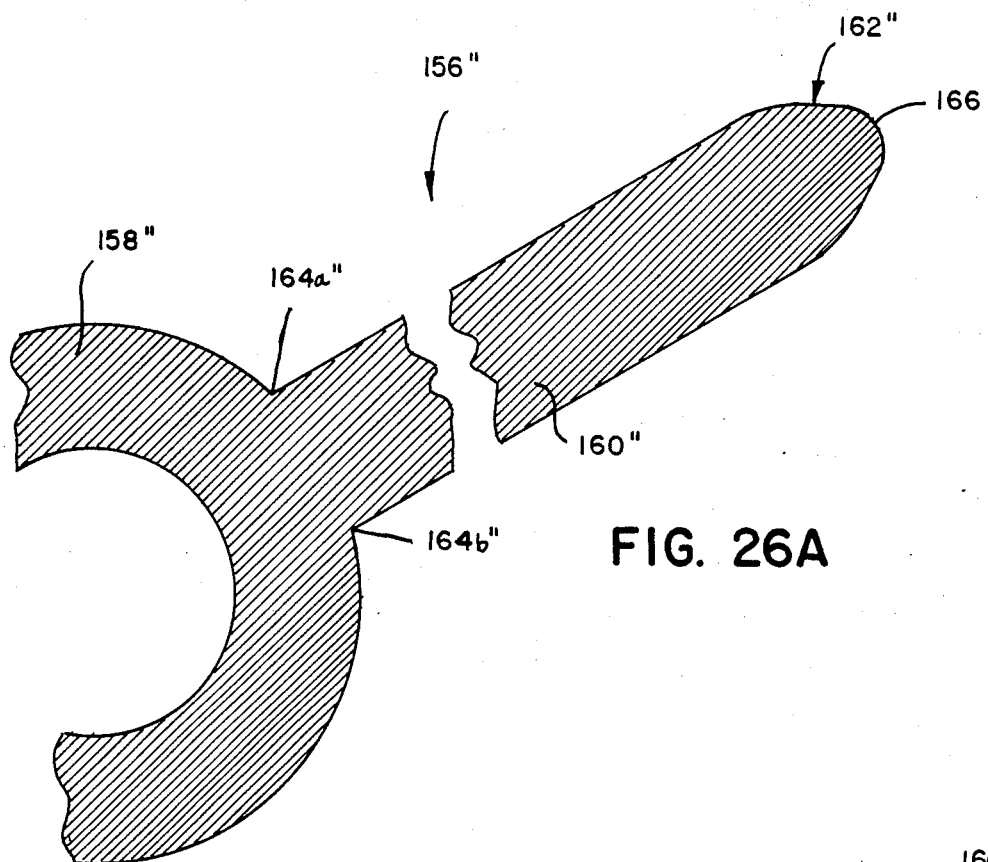
FIGS. 26A and 27A are fragmentary, enlarged views of FIGS. 26 and 27, respectively.
Figure 27A:
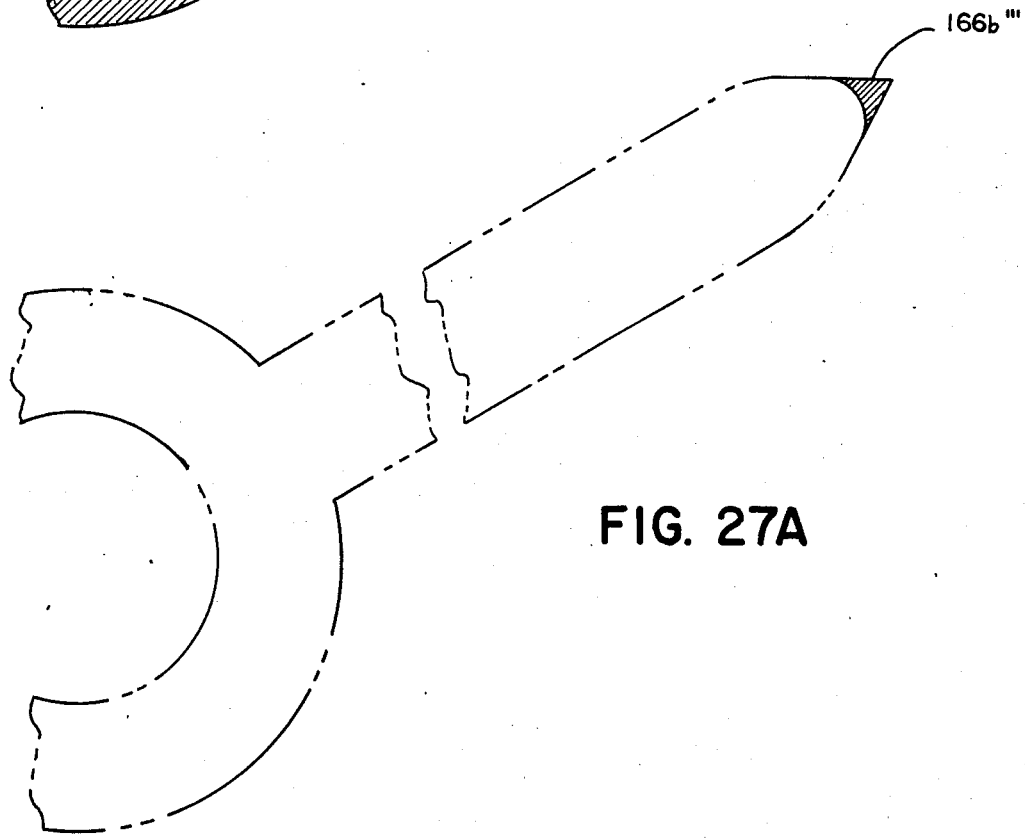

FIG. 22 is an image of analog watch hand 156 having circular head 158 and shaft 160 extending therefrom and terminating in point 162. The junction of shaft 160 and head 158 defines two sharp corners 164a and 164b. Pointed end 162 defines sharp corner 166. A digitzed image of FIG. 22 is inputted to memory 20 through line 18 from camera 12. The processing of the images illustrated in FIGS. 22-27 is digitally implemented. However, the images are shown in a continuous (Euclidean) manner. The digital result approximates the continuous image when the digital resolution is sufficiently fine. The sequence of processing steps illustrated in FIGS. 22-25 is implemented to erode the image. The sequence of processing steps illustrated in FIGS. 25-27 is implemented to dilate the eroded image and compare the resulting virtual image with the original FIG. 22 image to determine the position of the tip of the hand such that a robot can be directed to set the time on the watch. The image of FIG. 22 is real, while the images of FIGS. 23-27 are virtual images generated by system 10 to determine the position of hand 156.

Figure 23:
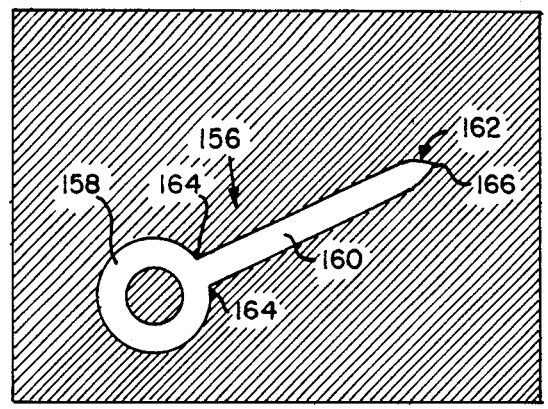
FIGS. 23-27 illustrate virtual images corresponding to the FIG. 22 image at the various stages of the geometric logic unit.

The image of FIG. 22 is transformed to the image of FIG. 23 by complementing the FIG. 22 image in ALU 24. More particularly, the image of FIG. 22 is routed over either line 30 or 32 to ALU 24 which complements the image pixel-by-pixel and returns the complemented image on line 34 to frame buffer 20. In complementing the image, corners 164 remain sharp as does point 166 (compare FIGS. 22 and 23).

Figure 24:
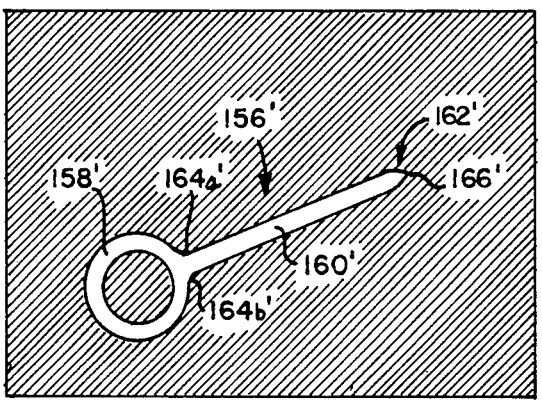

The image of FIG. 23 is processed to the image of FIG. 24 by dilating the dark pixels of FIG. 23 image by a circular structuring element having a diameter approximately ¼ the width of shaft 160. Consequently, shaft image 160' (FIG. 24) is approximately ½ the width of shaft image 160. In dilating the FIG. 23 image, the sharp concave corners 164 become rounded having a radius equal to the radius of the structuring element. However, the convex point 166 remains sharp. The processing of the FIG. 23 image to the FIG. 24 image is performed by GLU 22. More specifically, the digital image of FIG. 23 is input overline 26 from memory 20 into GLU 22 which returns the processed FIG. 24 image over line 28 to the memory.

The FIG. 24 image is processed to the FIG. 25 image by complementing the FIG. 24 image in ALU 24. The FIG. 25 image is then dilated by the identical digital circular structuring element as used to dilate the FIG. 23 image to produce the FIG. 26 image wherein the width of shaft 160" and head 158"]are returned to their original widths illustrated in FIG. 22. In the FIG. 26 image, corners 164a" and 164b" regain their sharpness as in FIG. 22. Point 166 becomes rounded having a radius equal to the radius of the structuring element (see also FIG. 26A). Therefore, the FIG. 26 image is closely similar to the FIG. 22 image with the exception that point 166 is rounded as illustrated generally at 166". Finally, the FIG. 27 is produced by exclusive ORing the FIG. 26 and FIG. 22 images in ALU 24. Consequently, FIG. 27 comprises only the pointed portion 166''' of the analog watch hand illustrated in greater detail in FIG. 27A. Based on the positions of remaining portion 166''', the image processor can easily determine the angular orientation of the hand, enabling a robot arm to move the hand to the correct position.

Therefore, by simply complementing, dilating, and complementing sequentially an image (as in FIGS. 22-25), that image is processed at previously unparalleled speeds. In this watch hand example, the processing time is five frame times or one-sixth second total. Furthermore, because processing is parallel in the sense that all pixels in an image are processed on each pass through ALU 24 or GLU 22, the positions of the hour hand and the minute hand of the watch are determined simultaneously. Further, the necessity of digital circuitry required to implement neighborhood logic functions is eliminated, enabling system 10 to be simpler while having improved speed over known devices.

Although system 10 has been described such that each pixel is represented by a single binary bit, it will be appreciated by those having ordinary skill in the art that the concepts disclosed herein are equally applicable to gray-scale imaging wherein each pixel is represented by a plurality of bits.

The above description is that of a preferred embodiment of the invention. Various changes and alterations might be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A method of manipulating an input digital representation of an image made up of a matrix of points by a dynamically selectable structuring element to produce an output digital representation, said method comprising:
   processing the input digital representation through a plurality of sequential stages, each stage including:
   selectively shifting the digital representation inputted to the stage; and
   operating on the representation inputted to the stage and the representation shifted by the stage to produce a digital representation outputted by the stage; and
   control means for dynamically selecting the shift provided by each shifting step, whereby the input digital representation can be sequentially shifted in a dynamically selectable pattern corresponding to a selectable structuring element.

2. A method as defined in claim 1 further comprising first serializing the input digital image representation.

3. A method as defined in claim 2 wherein each of said shifting steps comprises delaying the serialized digital signal inputted to that stage.

4. A method as defined in claim 3 wherein said selective delaying step includes controlling a programmable delay circuit.

5. A method as defined in claim 1 wherein the structuring element is polar symmetric.

6. A method as defined in claim 5 wherein the pattern represents translations between extreme points of the polar symmetric structuring element.

7. A method as defined in claim 1 wherein said operating step comprises selecting the maximum of the representation inputted to the stage and shifted by the stage.

8. A method of processing at least one image each made up of a matrix of points by a selectable structuring element, said method comprising:
serializing each matrix of points into an input serial signal;
repetitively performing the steps of:
controllably delaying at least one of the input serial signals to produce a delayed serial signal; and
operating on selected ones of the input serial signals and the delayed serial signals to produce at least one output signal; and
controlling the delay provided in each delaying step so that each input serial signal is delayed in a controllable pattern representing the selectable structuring element.

9. A method as defined in claim 8 wherein said operating step comprises selecting the maximum of the selected input and delayed signals.

10. A method as defined in claim 9 wherein the signals are binary and further wherein said selecting step comprises ORing one of the delayed signals and one of the input signals to produce the output signals.

11. A method as defined in claim 8 wherein said selective delaying step includes controlling a programmable delay circuit.

12. A method of processing a digital image representing a matrix of points by a selectable structuring element, said method comprising:
serializing the digital image into a serial signal;
repetitively performing the steps of:
controllably shifting the serial signal to produce a shifted serial signal; and
operating on the serial signal and the shifted serial signal to produce an output serial signal; and
dynamically controlling the shift provided by each shifting step to effect processing by a selectable structuring element.

13. A method as defined in claim 12 wherein each of said shifting steps comprises delaying the serial signal.

14. A method as defined in claim 13 wherein each matrix point is represented by a binary value of 0 or 1 and further wherein each of said operating steps comprises ORing the signals inputted to and delayed by the associated step group.

15. A method as defined in claim 13 wherein said selective delaying step includes controlling a programmable delay circuit.

16. A method as defined in claim 12 wherein each matrix point is represented by a binary value of 0 or 1 and further wherein each of said operating steps comprises ORing the serial signal and the shifted serial signal.

17. A method as defined in claim 12 wherein said operating step comprises selecting the maximum of the first serial signal and the second serial signal.

18. A method of manipulating at least one input serial signal each representative of an image to produce at least one resultant serial signal each representative of an image processed by a variable structuring element, said method comprising:
routing each input serial signal through a plurality of processing sequences each including:
supplying at least one serial signal each to an input port;
delaying at least one of the serial signals to produce at least one delayed signal each corresponding to one of the serial signals; and
operating on selected ones of the delayed signals and the serial signals to produce at least one output serial signal; and
varying the delay provided by each delaying step as each serial signal is routed therethrough so that each input signal is delayed in a variable pattern corresponding to a variable structuring element.

19. A method as defined in claim 18 wherein said operating step comprises selecting the maximum of the selected ones of the delayed signals and the serial signals.

20. A method as defined in claim 19 wherein the serial signals are binary signals and further wherein said selecting step comprises ORing one of the delayed signals and one of the serial signals.

21. A method as defined in claim 18 wherein said selective delaying step includes controlling a programmable delay circuit.

22. A system for processing a start image made up of a matrix of points by a dynamically selectable structuring element, said system comprising:
serializing means for producing a first serial signal representative of the start image;
a plurality of serially coupled processing stages each including:
controllable delay means for variably delaying the serial signal inputted to the stage producing a delay serial signal; and
function means for operating on the inputted serial signal and the delay serial signal producing an output serial signal outputted to the next stage; and
control means for dynamically controlling said delay means to delay the serialized signals in a pattern representing a dynamically selectable structuring element.

23. A system as defined in claim 22 wherein each point is represented by a binary value of 0 or 1 and further wherein said function means comprises means for ORing said inputted serial signal and said delay serial signal.

24. A system as defined in claim 22 wherein said function means comprises select means for selecting the maximum of the inputted serial signal and the delay serial signal.

25. A system for processing at least one serial signal each representative of an image made up of a matrix of points to produce at least one serial signal each representative of an image processed by a dynamically selectable structuring element, said system comprising:
at least one geometric logic unit, each including:
input port means for receiving at least one input serial signal;
controllable delay means for delaying at least one selected input signal to produce at least one delayed serial signal each corresponding to one of the input signals;
function means for operating on selected ones of the delayed and input signals to produce at least one output serial signal; and output port means for outputting each output signal; and first control means for routing the serial signal through a geometric logic unit at least twice; and second control means for dynamically controlling the delay provided by each said delay means each time the serial signal passes therethrough, whereby the serial signal can be delayed in a dynamically selectable pattern corrresponding to a dynamically selectable structuring element.

26. A system as defined in claim 25 wherein said function means comprises means for selecting the maximum of the selected ones of the delayed and input signals.

27. A system as defined in claim 26 wherein the serial signals are binary signals and further wherein said function means comprises means for ORing the selected ones of the delayed and input signals.

28. A system as defined in claim 25 wherein said delay means comprises a controllable variable delay circuit.

29. An image processing system for processing at least one start image each made up of a matrix of points by a selectable structuring element, said system comprising:

serializing means for producing at least one start serial signal each representative of one of the start images;

controllable delay means for variably time-delaying selected ones of the signals inputted thereto to produce at least one delayed serial signal each corresponding to one of the input signals;

operating means for operating on selected ones of the delayed signals and the input signals to produce at least one output serial signal; and first control means for repetitively routing the selected ones of the input signals through said delay means and said operating means; and second control means for controlling the length of the time delay provided by said delay means each time an input signal is delayed therethrough to effect processing by a selectable structuring element.

30. A system as defined in claim 29 wherein said signals are binary signals and further wherein said operating means comprises means for ORing one of the delay signals and one of the input signals.

31. A system as defined in claim 29 wherein said operating means comprises select means for selecting the maximum of the selected delayed and input signals.

* * * * *

UNITED STATES PATENT AND TRADEMARK OFFICE
CERTIFICATE OF CORRECTION

PATENT NO. : 4,665,554

DATED : May 12, 1987

INVENTOR(S) : Stanley R. Sternberg

Page 1 of 4

It is certified that error appears in the above-identified patent and that said Letters Patent is hereby corrected as shown below:

The title page should be deleted to appear as per attached title page;

Signed and Sealed this

Seventeenth Day of November, 1987

*Attest:*

DONALD J. QUIGG

*Attesting Officer*

*Commissioner of Patents and Trademarks*

United States Patent [19]
Sternberg

[11] Patent Number: 4,665,554
[45] Date of Patent: May 12, 1987

[54] APPARATUS AND METHOD FOR IMPLEMENTING DILATION AND EROSION TRANSFORMATIONS IN DIGITAL IMAGE PROCESSING

[75] Inventor: Stanley R. Sternberg, Ann Arbor, Mich.

[73] Assignee: Machine Vision International Corporation, Ann Arbor, Mich.

[21] Appl. No.: 513,448

[22] Filed: Jul. 13, 1983

[51] Int. Cl.⁴ .............................................. G06K 9/00
[52] U.S. Cl. ............................................ 382/27; 382/49
[58] Field of Search ............................ 382/27, 49–50, 382/54; 333/165; 307/606, 607

[56] References Cited

U.S. PATENT DOCUMENTS

| | | | |
|---|---|---|---|
| 3,106,699 | 10/1963 | Kamentsky | 340/172.5 |
| 3,214,574 | 10/1965 | Landsman et al. | 235/92 |
| 3,339,179 | 8/1967 | Shelton, Jr. et al. | 340/146.3 |
| 3,573,789 | 4/1971 | Sharp et al. | 340/324 |
| 3,675,049 | 7/1972 | Haven | 307/606 |
| 3,805,035 | 4/1974 | Serra | 382/49 |
| 3,846,754 | 11/1974 | Oka et al. | 340/146.3 H |
| 3,899,771 | 8/1975 | Saraga et al. | 340/146.3 AE |
| 4,167,728 | 9/1979 | Sternberg | 340/146.3 MA |
| 4,174,514 | 11/1979 | Sternberg | 340/146.3 MA |
| 4,290,049 | 9/1981 | Sternberg et al. | 340/146.3 MA |
| 4,301,443 | 11/1981 | Sternberg et al. | 340/146.3 MA |
| 4,322,716 | 3/1982 | Sternberg | 340/146.3 MA |
| 4,369,430 | 1/1983 | Sternberg | 340/146.3 MA |
| 4,395,697 | 7/1983 | Dargel et al. | 382/41 |
| 4,395,698 | 7/1983 | Sternberg et al. | 382/27 |
| 4,395,699 | 7/1983 | Sternberg | 382/41 |
| 4,395,700 | 7/1983 | McCubbrey et al. | 382/27 |

OTHER PUBLICATIONS

"Industrial Computer Vision by Mathematical Morphology" by Stanley R. Sternberg; Proceedings of the 13th International Symposium on Industrial Robots/Robots 7, Chicago, Ill., Apr. 18–20, 1983.

"Biomedical Image Processing" by Stanley R. Sternberg; Copyright 1983 IEEE; published Jan. 1983, issue of Computer, pp. 22–34.

"Computer Architectures Specialized for Mathematical Morphology" by Stanley R. Sternberg, Dept. of Electrical and Computer Engineering, University of Michigan; Workshop on Algorithmically Specialized Computer Organizations, Purdue Univ., West Lafayette, IN, Sep. 29–Oct. 1, 1982.

"A Comparison of Computer Vision Methodologies" by Stanley R. Sternberg; Dec. 21, 1981, Cytosystems Corp. Publication.

"Computer Architectures for Pictorial Information Systems" by Per-Erik Danielsson and Stefano Levialdi; Copyright 1981 IEEE; published in Nov. 1981, issue of Computer, pp. 53–67.

Pages 836–840 of IEEE Transactions on Computers, vol. C-29, No. 9, Sep. 1980, "Design of a Massively Parallel Processor" by Kenneth E. Batcher; Copyright 1980 IEEE.

"A Systemically Designed Binary Array Processor" by Anthony P. Reeves, published in the IEEE Transactions on Computers, vol. C-29, No. 4, Apr. 1980, pp. 278–287.

"Design and Use of DIP-1: A Fast, Flexible and Dynamically Microprogrammable Pipelined Image Processor" by F. A. Gerritsen and L. G. Aardema, Delft University of Technology, Delft, The Netherlands, Jan. 1980, Revised May 1980.

"Parallel Architectures for Image Processing" by Stanley R. Sternberg; Copyright 1979 IEEE Compsac.

"Basics of Cellular Logic with Some Applications in Medical Image Processing" by Kendall Preston, Jr., Michael J. B. Duff, Stephano Levialdi, Philip E. Norgren, and Jun-Ichiro Toriwaki; published in May 1979 Proceedings of the IEEE, vol. 67, No. 5, pp. 826–859.

(List continued on next page.)

Primary Examiner—Leo H. Boudreau
Attorney, Agent, or Firm—Price, Heneveld, Cooper, DeWitt & Litton

[57] ABSTRACT

The specification discloses a system and a method for processing digital representations of images to produce dilations and erosions at unparalleled speeds and efficiencies. The system includes digital circuitry for effecting a dilation by repetitively delaying the serialized digital image and ORing the delayed digital image back into the serial signal stream.

31 Claims, 34 Drawing Figures

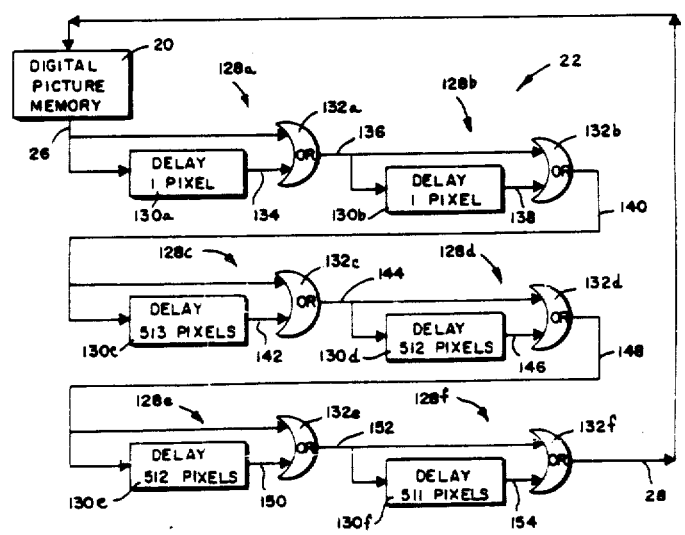

UNITED STATES PATENT AND TRADEMARK OFFICE
CERTIFICATE OF CORRECTION

PATENT NO. : 4,665,554                         Page 3 of 4

DATED : May 12, 1987

INVENTOR(S) : Stanley R. Sternberg

It is certified that error appears in the above-identified patent and that said Letters Patent is hereby corrected as shown below:

Column 2, line 26:
  "service" should be --device--.

Column 3, line 65:
  "of" should be --or--.

Column 3, line 67:
  "inftensity" should be --intensity--.

Column 4, line 13:
  "modre" should be --more--.

Column 4, line 37:
  "digital memory" should be --digital picture memory--.

Column 4, line 45:
  "storedd" should be --stored--.

Column 5, line 55:
  "ssuch" should be --such--.

Column 6, line 20:
  "vaalue" should be --value--.

Column 6, line 21:
  "that the" should be --that that--.

UNITED STATES PATENT AND TRADEMARK OFFICE
CERTIFICATE OF CORRECTION

PATENT NO. : 4,665,554

DATED : May 12, 1987

INVENTOR(S) : Stanley R. Sternberg

It is certified that error appears in the above-identified patent and that said Letters Patent is hereby corrected as shown below:

```
Column 6, line 49:
  after "pixels" insert --116--.

Column 7, line 6:
  "periosd" (2nd occurrence) should be --period--.

Column 7, line 21:
  "readding" should be --reading--.

Column 7, line 59:
  delete "but".

Column 8, line 5:
  "or" should be --and--.

Column 8, line 37:
  "3 to 3" should be --3 by 3--.

Column 9, line 55:
  "overline" should be --over line--.

Column 9, line 63:
  after "158" delete the bracket.

Column 10, line 3:
  after "Fig. 27" insert --image--.
```